United States Patent
Eckhardt et al.

(10) Patent No.: US 10,116,204 B1
(45) Date of Patent: Oct. 30, 2018

(54) DISTRIBUTION TRANSFORMER INTERFACE APPARATUS AND METHODS

(71) Applicants: Chad Eckhardt, Raleigh, NC (US); Stephen Timothy Watts, Fuquay-Varina, NC (US)

(72) Inventors: Chad Eckhardt, Raleigh, NC (US); Stephen Timothy Watts, Fuquay-Varina, NC (US)

(73) Assignee: Gridbridge, Inc., Raleigh, NC (US)

( * ) Notice: Subject to any disclaimer, the term of this patent is extended or adjusted under 35 U.S.C. 154(b) by 931 days.

(21) Appl. No.: 14/310,987

(22) Filed: Jun. 20, 2014

Related U.S. Application Data

(63) Continuation-in-part of application No. 13/725,036, filed on Dec. 21, 2012, now abandoned.

(51) Int. Cl.
*H02M 1/42* (2007.01)

(52) U.S. Cl.
CPC ................. *H02M 1/4208* (2013.01)

(58) Field of Classification Search
CPC .................................................. H02M 1/4208
See application file for complete search history.

(56) References Cited

U.S. PATENT DOCUMENTS

| | | | | |
|---|---|---|---|---|
| 4,533,986 A * | 8/1985 | Jones | ............... | H02M 1/4208 323/222 |
| 5,343,139 A * | 8/1994 | Gyugyi | ............... | G05F 5/00 174/DIG. 17 |
| 5,949,662 A * | 9/1999 | Boldin | ............... | H02J 9/062 307/66 |
| 6,340,851 B1 * | 1/2002 | Rinaldi | ............... | H01F 38/16 307/82 |
| 6,965,302 B2 * | 11/2005 | Mollenkopf | ........... | G02B 6/483 340/12.37 |
| 7,117,070 B2 * | 10/2006 | Chow | ............... | G05F 1/70 700/297 |
| 7,813,884 B2 * | 10/2010 | Chu | ............... | H02J 3/06 307/98 |
| 7,843,166 B2 | 11/2010 | Shimada et al. | | |
| 8,013,702 B2 * | 9/2011 | Haj-Maharsi | ........... | H01F 27/40 174/50 |

(Continued)

FOREIGN PATENT DOCUMENTS

WO WO 2012103951 A2 * 8/2012 ............ H02J 3/1857

OTHER PUBLICATIONS

Zhao et. al., "Operation of series and shunt converters with 48-pulse series connected three-level NPC converter for UPFC," IEEE Industrial electronics 2008, pp. 3296-3301.*

(Continued)

*Primary Examiner* — Thienvu Tran
*Assistant Examiner* — Pinping Sun
(74) *Attorney, Agent, or Firm* — Andres R. Shores; Williams Mullen

(57) ABSTRACT

An apparatus includes at least one external source terminal configured to be connected to at least one secondary terminal of a distribution transformer and at least one external load terminal configured to be connected to a load. The apparatus further includes a converter circuit coupled to the at least one external source terminal and to the at least one external load terminal and configured to provide shunt current regulation and series voltage regulation.

24 Claims, 17 Drawing Sheets

(56) References Cited

U.S. PATENT DOCUMENTS

| | | | | |
|---|---|---|---|---|
| 8,514,601 | B2* | 8/2013 | Alexander | H02M 5/225 |
| | | | | 363/132 |
| 8,853,887 | B2* | 10/2014 | Silberbauer | H02J 9/06 |
| | | | | 307/64 |
| 2002/0154000 | A1* | 10/2002 | Kline | G02B 6/483 |
| | | | | 370/489 |
| 2005/0015182 | A1* | 1/2005 | Bebic | H02J 3/1814 |
| | | | | 700/286 |
| 2005/0071050 | A1* | 3/2005 | Chow | G05F 1/70 |
| | | | | 700/286 |
| 2010/0201338 | A1 | 8/2010 | Haj-Maharsi et al. | |
| 2010/0220499 | A1* | 9/2010 | Haj-Maharsi | H02M 1/4216 |
| | | | | 363/13 |
| 2013/0278235 | A1* | 10/2013 | Divan | G05F 1/12 |
| | | | | 323/282 |
| 2014/0133185 | A1* | 5/2014 | Wijekoon | H02J 3/00 |
| | | | | 363/16 |

OTHER PUBLICATIONS

Ale-Emran, et. al.,"Combined operation of upqc and fuel cell with common dc bus,"Renewable energies and power quality Journal, vol. 1 No. 6, Mar. 2008, pp. 794-798.*

Sen, et. al., "Introduction to Facts controllers: Theory, Modeling and Applications," Jan. 1, 2009, pp. 60-61.*

Office Action dated Apr. 22, 2015.

Bala S., "hybrid Distribution Transformer: Convept Development and field Demonstration", Energy Conversion Congress and Exposition (ECCE), 2012 IEEE, pp. 4061-4068, Sep. 2012.

* cited by examiner

DISTRIBUTION TRANSFORMER INTERFACE APPARATUS AND METHODS

CROSS-REFERENCE TO RELATED APPLICATION

The present application is a continuation-in-part of U.S. application Ser. No. 13/725,036 titled "Distribution Transformer Interface Apparatus and Methods" filed on Dec. 21, 2012, which is incorporated herein by reference in its entirety.

STATEMENT REGARDING FEDERALLY SPONSORED RESEARCH OR DEVELOPMENT

Not applicable to this application.

BACKGROUND

Field of the Disclosure

The inventive subject matter relates to power distribution apparatus and methods and, more particularly, to distribution transformer apparatus and methods.

Background of the Disclosure

Electric utility systems typically distribute power using transmission and distribution networks. High voltage (e.g., 100 kV and above) transmission networks are used to convey power from generating stations to substations that feed lower voltage (e.g., less than 100 kV) distribution networks that are used to carry power to homes and businesses. In a typical distribution network used in residential areas, for example, a 7.2 kV single phase distribution line may be run along a street, with individual residences being fed via respective service drops from distribution transformers that step down the voltage to a 120/240V service level. The electrical distribution system in the United States, for example, includes millions of such distribution transformers.

Although conventional distribution transformers are rugged and relatively efficient devices, they generally have limited control capabilities. For example, the impedance of the load connected to a distribution transformer typically dictates reactive power flow through the transformer, as typical conventional distribution transformers have no ability to control reactive power flow. In addition, while traditional distribution transformers can be enhanced to adjust voltage provided to the load using mechanisms such as tap changers, such capabilities are typically more expensive and seldom used, and typically cannot effectively regulate the load voltage in real time to compensate for transient sags and spikes. Conventional distribution transformers also typically have no capability to compensate for harmonics introduced by non-linear loads. Hybrid transformers that may address some of these issues are described in U.S. Pat. No. 8,013,702 to Haj-Maharsi et al., U.S. Patent Application Publication No. 2010/0220499 to Haj-Maharsi et al., U.S. Patent Application Publication No. 2010/0201338 to Haj-Maharsi et al. and the article by Bala et al. entitled "Hybrid Distribution Transformer: Concept Development and Field Demonstration," IEEE Energy Conversion Congress & Exposition, Raleigh, N.C. (Sep. 15-20, 2012).

SUMMARY

Some embodiments of the inventive subject matter provide an apparatus including at least one external source terminal configured to be connected to at least one secondary terminal of a distribution transformer and at least one external load terminal configured to be connected to a load. The apparatus may also include a shunt converter circuit having a first port coupled to the at least one external source terminal to provide parallel connection to a secondary winding of the distribution transformer. The apparatus further includes a series converter circuit having a first port coupled between the at least one external load terminal and the at least one external source terminal and a second port coupled to a second port of the shunt converter circuit. The shunt converter circuit and the series converter circuit may be configured to control a current at the at least one external source terminal and a voltage at the at least one external load terminal, respectively. The apparatus may further include at least one energy storage device, such as at least one capacitor, coupled to the second ports of the shunt converter circuit and the series converter circuit. In some embodiments, the series converter circuit or the shunt converter circuit may thus comprise a switching circuit. In other embodiments, the shunt converter circuit may have a first switching circuit and the series converter circuit may have a second switching circuit, such that the apparatus may be configured with the first switching circuit powering the second switching circuit for a desired quantity of power processing.

In some embodiments, the apparatus may include a DC/DC converter circuit coupled between the shunt converter circuit and the series converter circuit. The DC/DC converter circuit may include a dual active bridge circuit. The dual active bridge circuit may include an input bridge circuit, a plurality of output bridge circuits and a transformer coupling the input bridge circuit to the plurality of output bridge circuits via a common magnetic core. The series converter circuit may include a plurality of series converter circuits, respective ones of which are coupled to respective ones of the output bridge circuits of the dual active bridge circuit. The at least one external source terminal may include a plurality of external source terminals configured to be coupled to split-phase secondary terminals of the distribution transformer and the at least one external load terminal may include a plurality of external load terminals. The shunt converter circuit may be coupled to the plurality of external source terminals, and respective ones of the plurality of series converter circuits may be configured to be coupled to respective ones of the plurality of external load terminals and provide a split-phase service.

In some embodiments, the series converter circuit includes a switching circuit and a transformer having a first winding coupled to switching circuit. A second winding of the transformer may be configured to be coupled in series with the load. In some embodiments, the series converter circuit may include a switching circuit configured to be coupled in series with the load.

In some embodiments, the apparatus includes a DC bus coupling the second ports of the shunt converter circuit and the series converter series converter circuit and at least one external DC terminal coupled to the DC bus and configured to be coupled to an external device. The apparatus may further include a bypass switch configured to bypass the series converter circuit.

In some embodiments, the at least one external source terminal, the at least one external load terminal, the shunt converter circuit and the series converter circuit may be packaged in a unit configured to be mounted proximate the distribution transformer. The unit may be configured to be mounted on a pole-mount distribution transformer and/or on a pad mounted distribution transformer.

Further embodiments of the inventive subject matter provide a distribution transformer interface unit including a frame, a set of source terminals supported by the frame and configured to be coupled to a set of secondary terminals of a distribution transformer, and a set of load terminals supported by the frame and configured to be coupled to a load. The unit further includes a shunt converter circuit supported by the frame and coupled to the set of source terminals to provide parallel connection to a secondary winding of the distribution transformer and a series converter circuit supported by the frame and coupled to the set of load terminals to provide series connection with the load and to be coupled to the shunt converter circuit via a DC bus. The unit may further include at least one energy storage device, such as at least one capacitor, supported by the frame and coupled to the DC bus. The unit may also include a DC/DC converter circuit supported by the frame and coupled between the shunt converter circuit and the series converter circuit. The unit may further include a set of DC connection terminals coupled to the DC bus and configured to be coupled to an external device, such as a battery, photovoltaic system or other energy storage and/or power generation device. The frame of the unit may be configured to be mounted on or near the distribution transformer.

Further embodiments of the inventive subject matter provide an apparatus including at least one external source terminal configured to be connected to at least one secondary terminal of a distribution transformer, at least one external load terminal configured to be connected to a load and a converter circuit coupled to the at least one external source terminal and to the at least one external load terminal and configured to provide shunt current regulation at the at least one external source terminal and voltage regulation at the at least one external load terminal. In some embodiments, the converter circuit may include separate shunt and series converter circuits coupled by a DC bus. In further embodiments, the converter circuit may include a shunt/series converter circuit configured to perform shunt current regulation and series voltage regulation using a common switching circuit.

Some embodiments provide methods of retrofitting an existing distribution transformer. A distribution transformer interface unit including a shunt converter circuit and a series converter circuit coupled by a DC bus is mounted on or near the existing distribution transformer. The distribution transformer interface unit is connected to a secondary winding of the existing distribution transformer and to a load to support parallel coupling of the shunt converter circuit and the secondary winding and series coupling of the series converter circuit and the load. The shunt converter circuit and the series converter circuit may be operated to regulate a current in the secondary winding and a voltage at the load, respectively. The voltage may, for example, be regulated or varied between an upper and lower limit by the shunt converter. The DC bus of the distribution transformer interface unit may also be connected to an external device, such as a battery or other power source.

DETAILED DESCRIPTION

Figure 1:
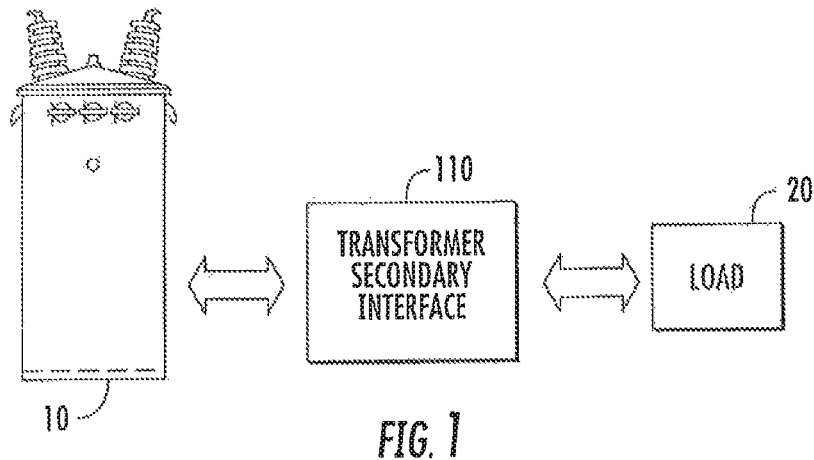
FIG. 1 is a schematic diagram illustrating a distribution transformer interface apparatus according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from a realization that improved performance may be obtained from distribution transformers by using them in conjunction with a solid-state interface apparatus including coupled shunt and series converters that may be used to regulate current and load voltage for a service drop. Millions of distribution transformers are currently used in power distribution systems, and replacement of these devices with pure solid state or hybrid transformers that require customized transformer design and manufacturing would generally be prohibitively costly. In addition, replacing existing devices is also potentially wasteful, as existing devices are generally rugged and stand to provide years of additional service with relatively low maintenance. However, such a capability may be provided by distribution transformer interface units configured for retrofit of existing distribution transformer installations. Such units can be relatively low cost, low voltage and low power devices that are installed on the secondary side of the transformer, where generally benign voltage requirements allow the use of relatively reliable and inexpensive power electronics components.

FIG. 1 illustrates distribution transformer interface apparatus 110 according to some embodiments. The apparatus 100 is configured to be coupled to a distribution transformer 10, such as a pole-mounted or pad-mounted distribution transformer. The apparatus 110 provides an interface between the distribution transformer 10 and a load 20, such as one or more residences or other facilities. In some embodiments, the apparatus 110 may include solid state converter circuitry configured to provide current regulation at the transformer side and voltage regulation for the load 20. As explained in further detail below, the apparatus 110 may be configured to be mounted on the distribution transformer 10 and/or on structures, such as a distribution pole or pad, that support or are nearby the distribution transformer 10.

Figure 2:
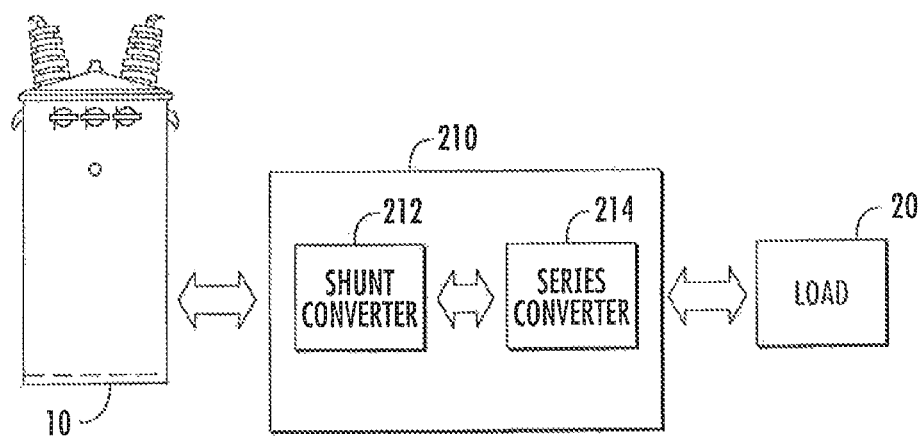
FIG. 2 is a schematic diagram illustrating a distribution transformer interface apparatus according to further embodiments of the inventive subject matter.

Referring to FIG. 2, in some embodiments, a distribution transformer interface apparatus 210 may include a shunt converter circuit 212 and a series converter circuit 214 that are coupled to one another. The shunt converter circuit 212 may have a first port coupled to at least one external source terminal of the apparatus 210 to support parallel connection to a secondary winding of a distribution transformer 10. The series converter circuit 214 may have a first port coupled between at least one external load terminal of the apparatus 210 for connection to a load 20, and a second port coupled to a second port of the shunt converter circuit 212.

The shunt converter circuit 212 may control a secondary winding current of the distribution transformer 10 to provide, for example, power factor correction, reactive power injection, or absorption and/or harmonic compensation. The series converter circuit 214 may be configured to regulate a voltage provided to the load 20, to compensate for voltage sags, spikes and other irregularities. In some embodiments, the shunt converter circuit 212 and the series converter circuit 214 may be coupled by a DC bus, to which at least one energy storage device, such as at least one capacitor and/or at least one battery, is coupled. In further embodiments, the shunt converter circuit 212 and the series converter circuit 214 may be coupled by an intervening DC/DC converter circuit, which may provide voltage conversion, voltage isolation or other features.

Figure 3:
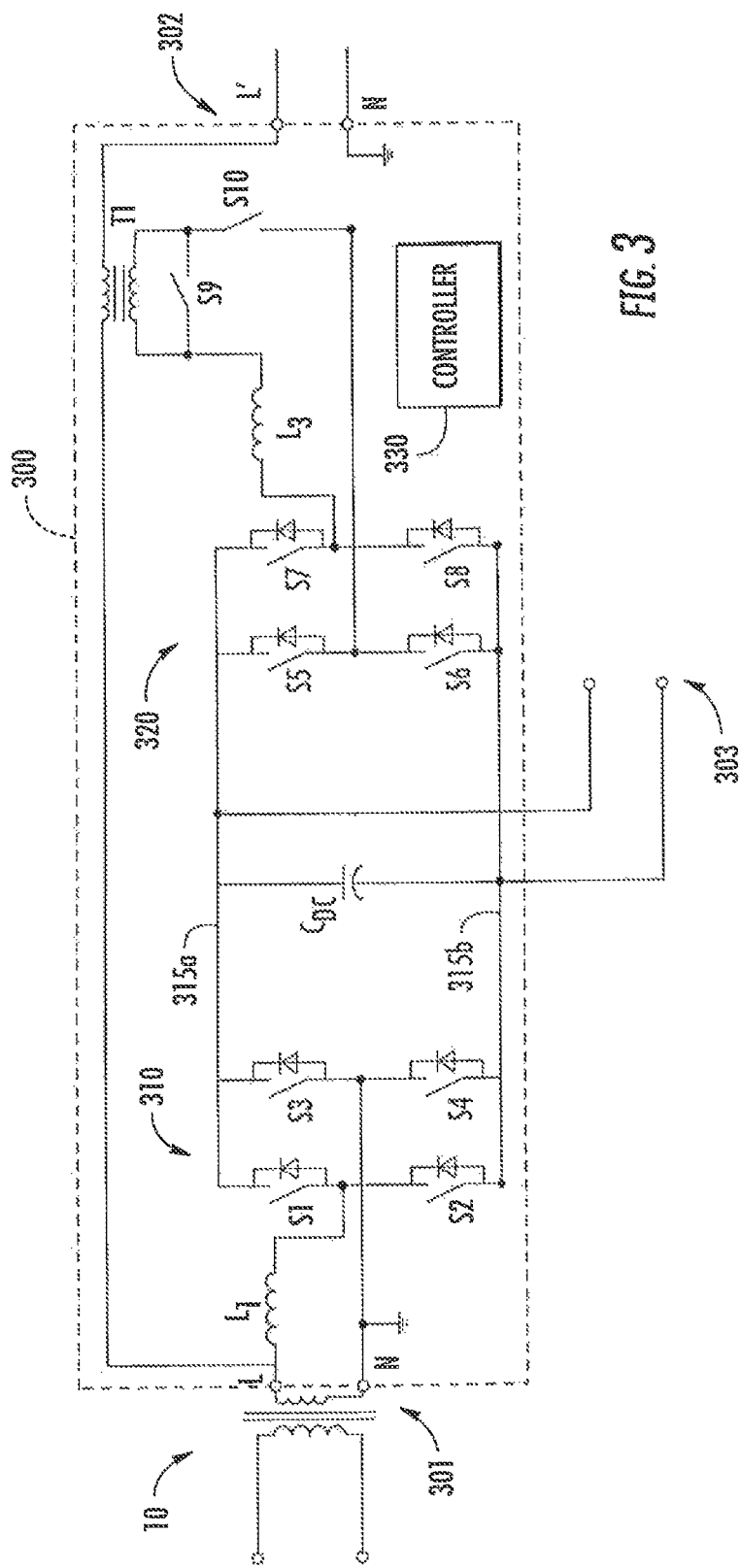
FIGS. 3-14 are schematic diagrams illustrating circuit implementations for distribution transformer interface apparatus according to various embodiments of the inventive subject matter.

FIG. 3 illustrates a single phase transformer interface apparatus 300 according to some embodiments. The apparatus 300 includes a shunt converter apparatus 310 having two-port external source terminals 301 coupled to conductors L, N and configured to be coupled to a distribution transformer 10. The apparatus 300 further includes external load terminals 302 coupled to conductors L', N and configured to be coupled to a load 20.

The apparatus 300 also includes a shunt converter circuit 310 having a first port coupled to the external source terminals 301, and including semiconductor switches (e.g., insulated gate bipolar transistors (IGBTs), power MOSFETs, or the like) S1, S2, S3, S4, and an inductor L1. In another embodiment, distribution transformer 10 may be replaced with an inverter of any sort that is in turn connected to an energy storage device or renewable generation source. In some embodiments, L may have a physical switch inserted. Further, A1 through S4 may be coupled individually with capacitor C. A second port of the shunt converter circuit 310 is coupled to DC busses 315a, 315b. The apparatus 300 further includes a series converter circuit 320 having a first port coupled to the second port of the shunt converter circuit 310 via the DC busses 315a, 315b. The series converter circuit 320 includes semiconductor switches S5, S6, S7, S3, an inductor L3, and a transformer T1 having a first winding coupled in series between one of the external source terminals 301 and one of the external load terminals 302.

An energy storage device, here shown as a capacitor CDC, is coupled to the DC busses 315a, 315b and provides energy storage to support power transfers between the shunt converter circuit 310 and the series converter circuit 320. As further shown, the apparatus 300 may further include external DC terminals 303, which may be used for connection to additional energy storage, such as additional batteries and/or capacitors, and/or to external DC loads and/or to external DC power sources, such as solar, wind, fuel cell and/or other types of electrical power generators.

A controller circuit 330 controls the shunt converter circuit 310 and the series converter circuit 320 to provide current regulation at the input port of the shunt converter circuit 310 and voltage regulation at the output port of the series converter circuit 320. In particular, the controller circuit 330 may control the switches S1, S2, S3, S4 of the shunt converter circuit 310 such that the shunt converter circuit 310 acts as a rectifier with power factor correction, harmonic mitigation and/or other control capabilities. The controller circuit 330 may similarly control the switches S5, S6, S7, S8 of the series converter circuit 320 such that it acts as a DC to AC inverter, generating an AC voltage across the series connected winding of the transformer T1 to regulate the voltage applied to the external load. It will be appreciated that the controller circuit 330 may be implemented using digital circuitry (e.g., a microprocessor, microcontroller or the like), analog circuitry and combinations thereof. Controller circuit 330 may include non-volatile storage capabilities for the purposes of storing performance and behavioral data.

Figure 20:
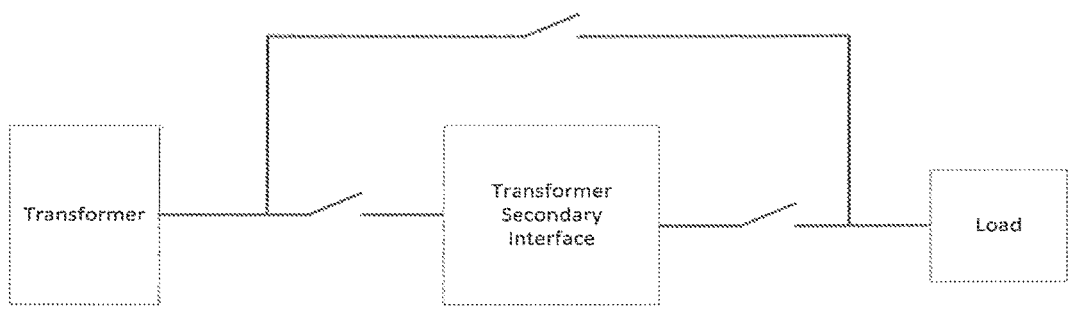
FIG. 20 is an illustration of an alternate embodiment.

As further shown, the apparatus 300 may further include bypass and disconnect switches S9, S10, which may be used to decouple the series converter circuit 320 from the external load in the case of, for example, failure of circuitry within the apparatus 300. The switches S9, S10 may be controlled, for example, by the control circuit 330 and/or by manual intervention. It will be appreciated that the bypass and disconnect switches S1, S2 may include mechanical, electromechanical and/or semiconductor switching devices. In some embodiments, the apparatus 300 may further include additional circuitry that supports providing a status indication, such as communications circuitry and/or mechanical indicators that provide, for example, a visual indication of the status of components of the apparatus 300. For example, such indicator may indicate, for example, status of the switches S9, S10 or other circuitry within the apparatus 300. In some alternatives, a manual external bypass switch may be used to enable an operator to bypass the apparatus (See, e.g., FIG. 20, manual bypass).

Figure 4:
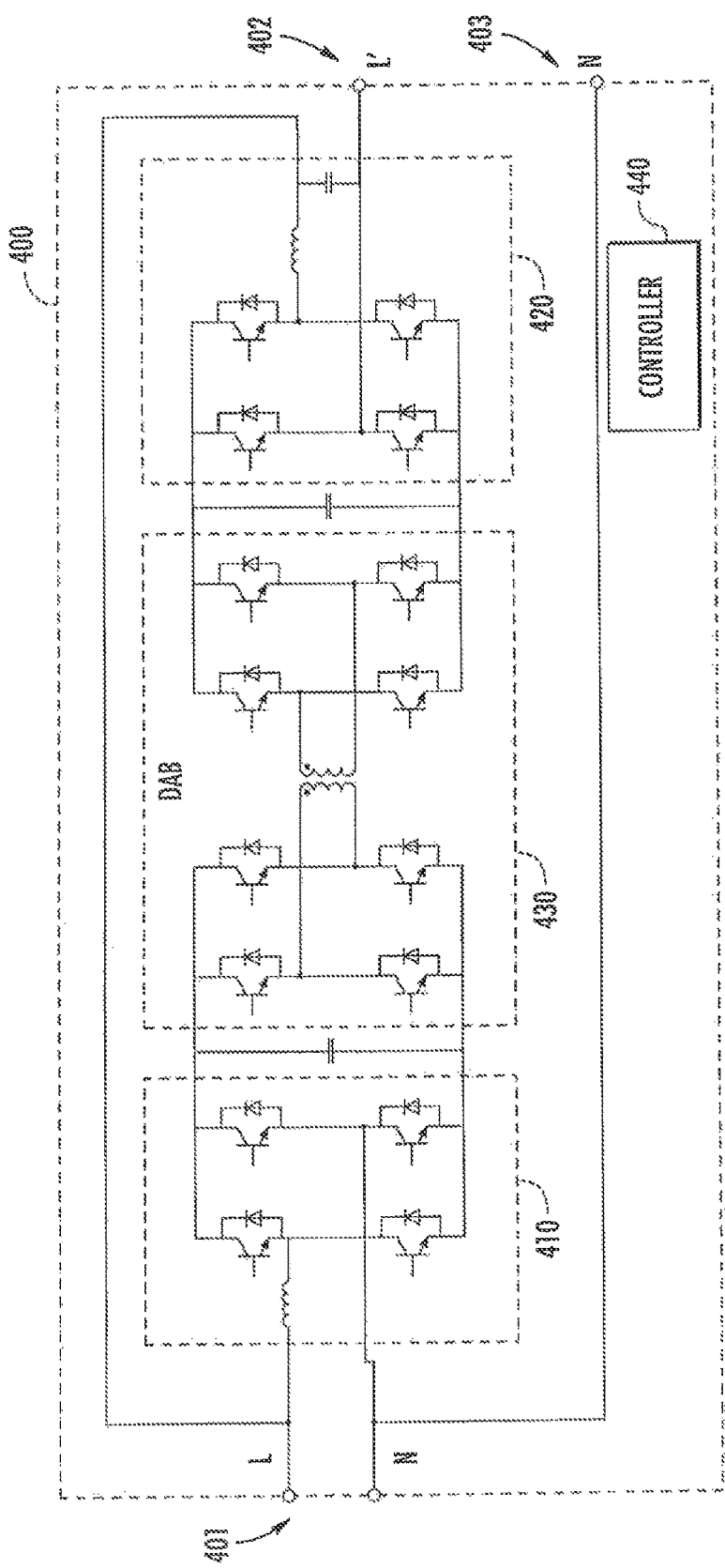

FIG. 4 illustrates a transformer interface apparatus 400 according to further embodiments. The apparatus 400 includes a shunt converter circuit 410 having a first port coupled to external source terminals 401 coupled to conductors L, N and connected to a secondary winding of a distribution transformer. The apparatus 400 also includes a series converter circuit 420 having a port coupled to external load terminals 402. The shunt converter circuit 410 and the series converter circuit 420 are coupled by a DC/DC converter circuit 430, here in the form of a dual active bridge (DAB). The DC/DC converter circuit 430 utilizes a higher frequency transformer and provides a voltage conversion between the shunt converter circuit 410 and the series converter circuit 420. As shown, the apparatus 400 also includes a controller circuit 440, which is configured to control the shunt converter circuit 410, the series converter circuit 420 and the DC/DC converter circuit 430. It will be appreciated that the controller circuit 440 may be implemented using digital circuitry (e.g., a microprocessor, microcontroller or the like), analog circuitry or a combination thereof. As shown, the apparatus 400 also includes one or more external DC terminals 403, which may be used for connection to additional energy storage, such as additional batteries and/or capacitors. The DC terminals 403 may be also be used for connection to external DC load and/or external DC power sources, such as solar, wind, fuel cell and other types of generators.

Figure 5:
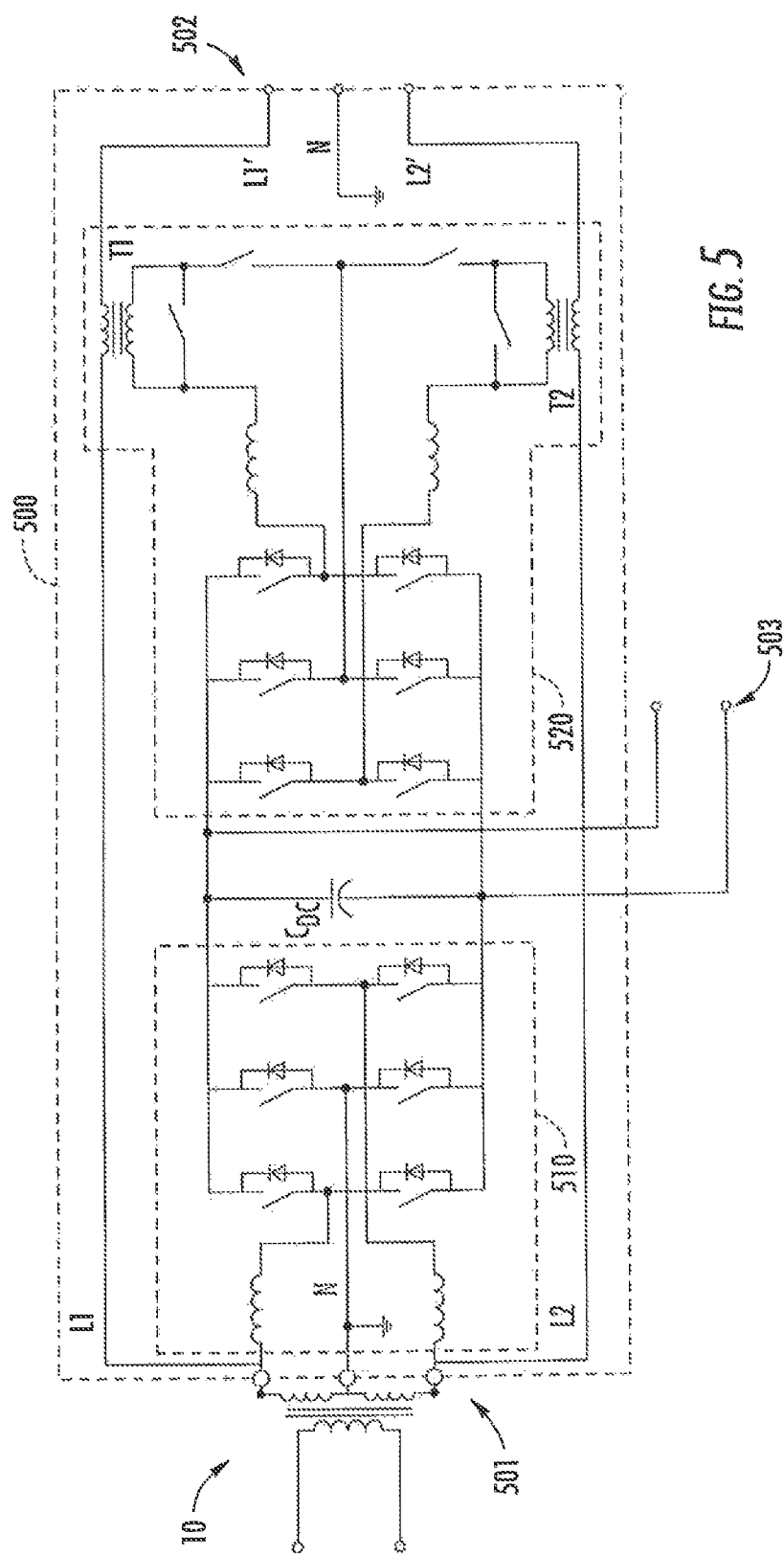

Further embodiments of the inventive subject matter are applicable to split-phase (sometimes referred to as "single phase, three wire" or "two-phase") electrical service applications. For example, FIG. 5 illustrates distribution transformer interface apparatus 500 includes external source terminals 501 that are coupled to phase and neutral conductors L1, L2, N and configured to be coupled to end and center tap winding terminals of a distribution transformer 10. The apparatus 500 also include external load terminals coupled to phase and neutral conductor L1', L2', N and configured to be coupled to loads connected between the phase conductors L1', L2', N. The apparatus 500 includes a shunt converter circuit 510 having a port coupled to the external source terminals 501 and a series converter circuit 520 coupled to the external load terminals 502. The shunt converter circuit 510 and the series converter circuit 520 are coupled by DC busses, with a capacitor CDC providing energy storage. The shunt converter circuit 510 is coupled across both portions of the secondary winding of the distribution transformer 10, and the series converter circuit 520 includes first and second transformers T1, T2 configured to be coupled in series with the load in respective output phases. As shown, the apparatus 500 may include external DC terminals 503 and bypass switches to decouple the series converter circuit 520 from the load. The shunt converter circuit 510, the series converter circuit 520 and other components of the apparatus 500 may be controlled using, for example, a microprocessor-based controller. The DC terminals 503 may be used for connection to additional energy storage, such as additional batteries and/or capacitors. The DC terminals 503 may be also be used for connection to external DC load and/or external DC power sources, such as solar, wind, fuel cell and other types of generators.

Figure 6:
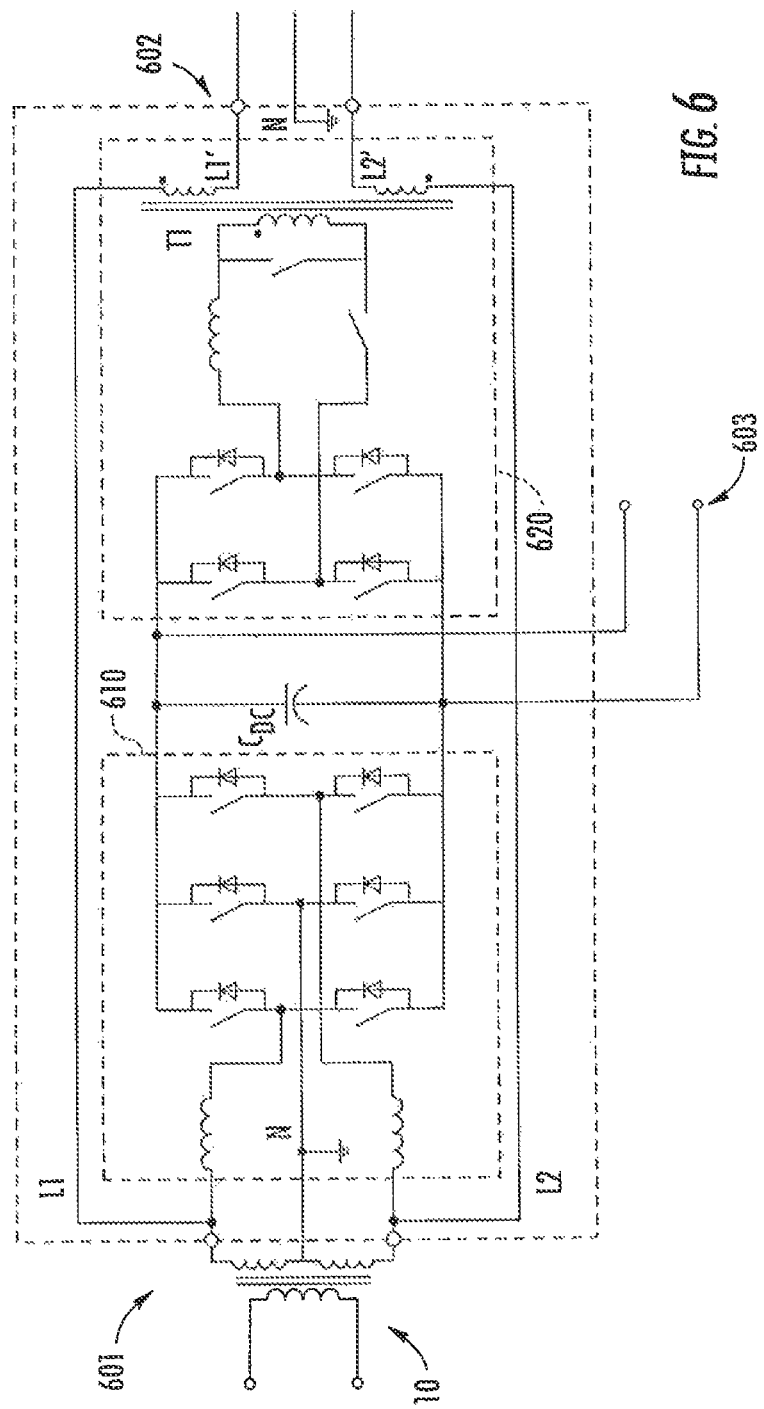

FIG. 6 illustrates a distribution transformer interface apparatus 600 according to further embodiments. The apparatus 600 includes external source terminals 601 that are coupled to phase and neutral conductors L1, L2, N and configured to be coupled to end and center tap winding terminals of a distribution transformer 10. The apparatus also includes external load terminal 602 coupled to phase and neutral conductors L1', L2', N and configured to be coupled to a load. The apparatus 600 includes a shunt converter circuit 610 having a port coupled to the external source terminals 601 and a series converter circuit 620 coupled to the external load terminals 602. The shunt converter circuit 610 and the series converter circuit 620 are coupled by DC busses, with a capacitor CDC providing energy storage. The shunt converter circuit 610 is coupled across both portions of the secondary winding of the distribution transformer 10, and the series converter circuit 620 includes a transformer T1 with multiple secondary windings configured to be coupled in series with the load in respective output phases. As shown, the apparatus 600 may include external DC terminals 603 and switches to decouple the series converter circuit 620 from the load. The shunt converter circuit 610, the series converter circuit 620 and other components of the apparatus 600 may be controlled using, for example, a microprocessor-based controller. The DC terminals 603 may be used for connection to additional energy storage, such as additional batteries and/or capacitors. The DC terminals 603 may be also be used for connection to external DC load and/or external DC power sources, such as solar, wind, fuel cell and other types of generators.

Figure 7:
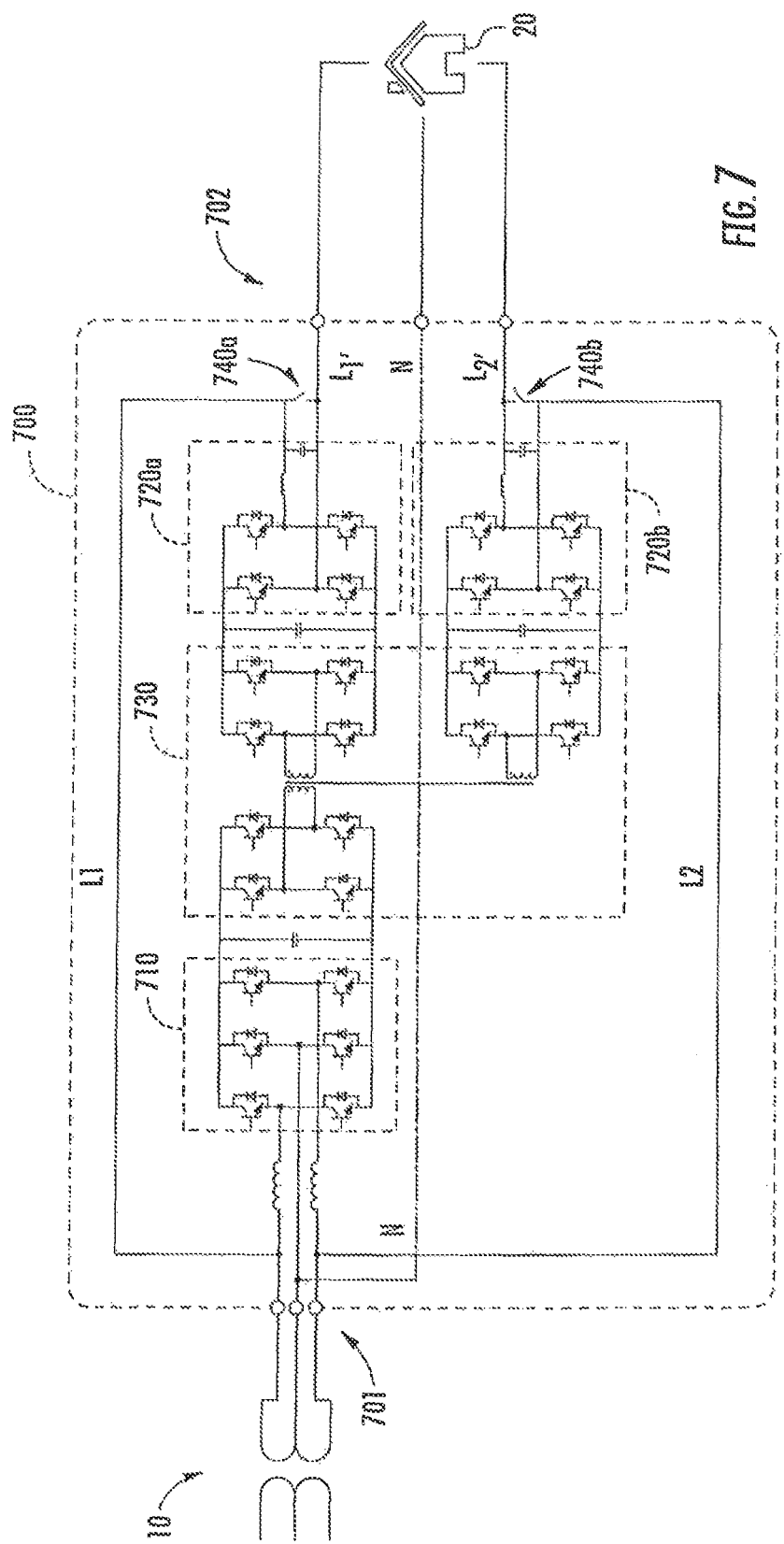
Figure 8:
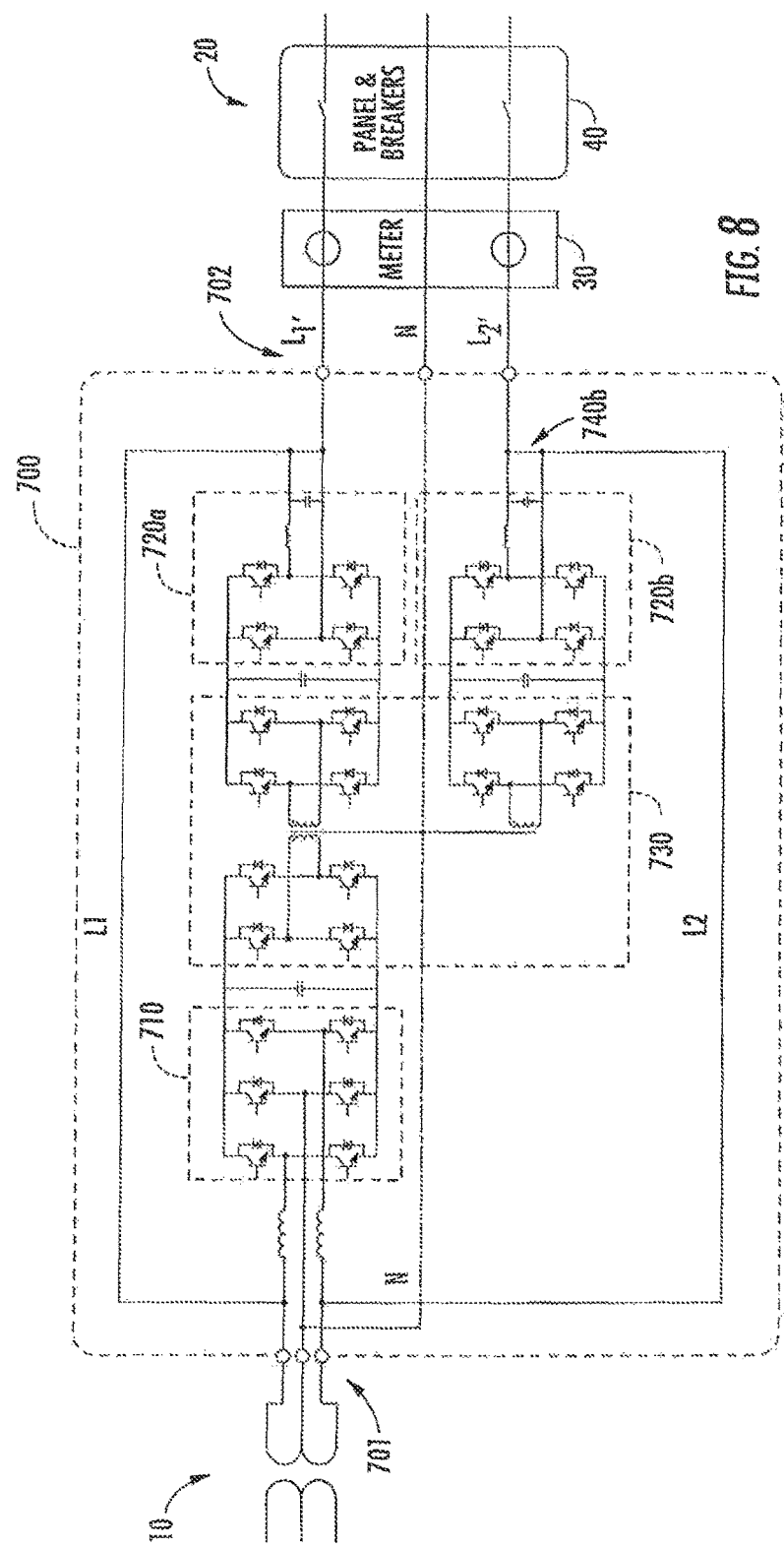

FIG. 7 illustrates a distribution transformer interface apparatus 700 including an intermediate dual active bridge DC/DC converter. The apparatus 700 shown includes external source terminals 701 coupled to conductors L1, L2, N and configured to be coupled to end and center tap winding terminals of a distribution transformer 10. The apparatus 700 also includes external load terminals 702 coupled to phase and neutral conductors L1', L2', N and configured to be coupled to a load 20, here illustrated as a residence receiving a three-wire single phase (split-phase) service. The apparatus 700 includes a shunt converter circuit 710 having a port coupled to the external source terminals 701 and first and second series converter circuits 720a, 720b coupled to the external load terminals 702. The shunt converter circuit 710 and the series converter circuits 720a, 720b are coupled by a dual active bridge DC/DC converter circuit 730, with intervening capacitors providing energy storage. The shunt converter circuit 710 is coupled across both portions of the secondary winding of the distribution transformer 10 and output ports of the series converter circuits 720a, 720b are configured to be coupled in series with respective ones of the phase conductors L1', L2'. Switches 740a, 740b may be provided to bypass the series converter circuits 720a, 720b. The shunt converter circuit 710, the series converter circuits 720a, 720b, the DC/DC converter circuit 730 and other components of the apparatus 700 may be controlled using, for example, a microprocessor-based controller. Referring to FIG. 8, the apparatus 700 may be coupled between the distribution transformer 10 and electrical service meter 30 that feeds a breaker panel 40 or other distribution circuitry at customer premises.

Figure 9:
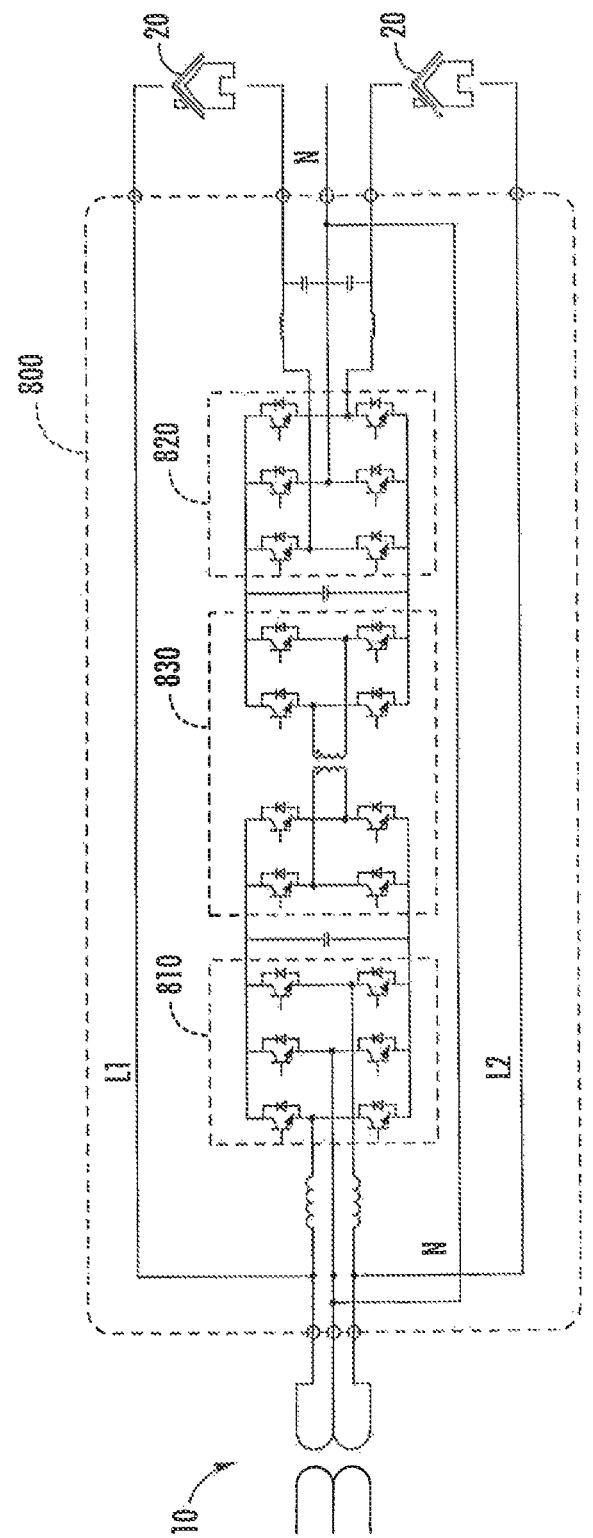

FIG. 9 illustrates an alternative arrangement for interfacing to a split phase secondary of a distribution transformer. In another embodiment, distribution transformer 10 may be replaced with an inverter of any sort that is in turn connected to an energy storage device or renewable generation source. Some embodiments may also replace distribution transformer 10 with a line regulator or load tap-changer. Further, distribution transformer 10 may be replaced in some embodiments with other forms of transformers. Optionally, a switch may be added to L1 and L2 that switches them out simultaneously. A distribution transformer interface apparatus 800 includes a shunt converter circuit 810 having a port configured to be coupled to a secondary winding of a distribution transformer 10. A series converter circuit 820 has respective phases that are configured to be coupled to respective return conductors from loads 20a, 20b fed by phase conductors L1, L2. The shunt converter circuit 810 and the series converter circuit 820 are coupled by a dual active bridge DC/DC converter circuit 830, with intervening capacitors providing energy storage. The shunt converter circuit 810, the series converter circuit 820 and other components of the apparatus 800 may be controlled using, for example, a microprocessor-based controller.

Figure 10:
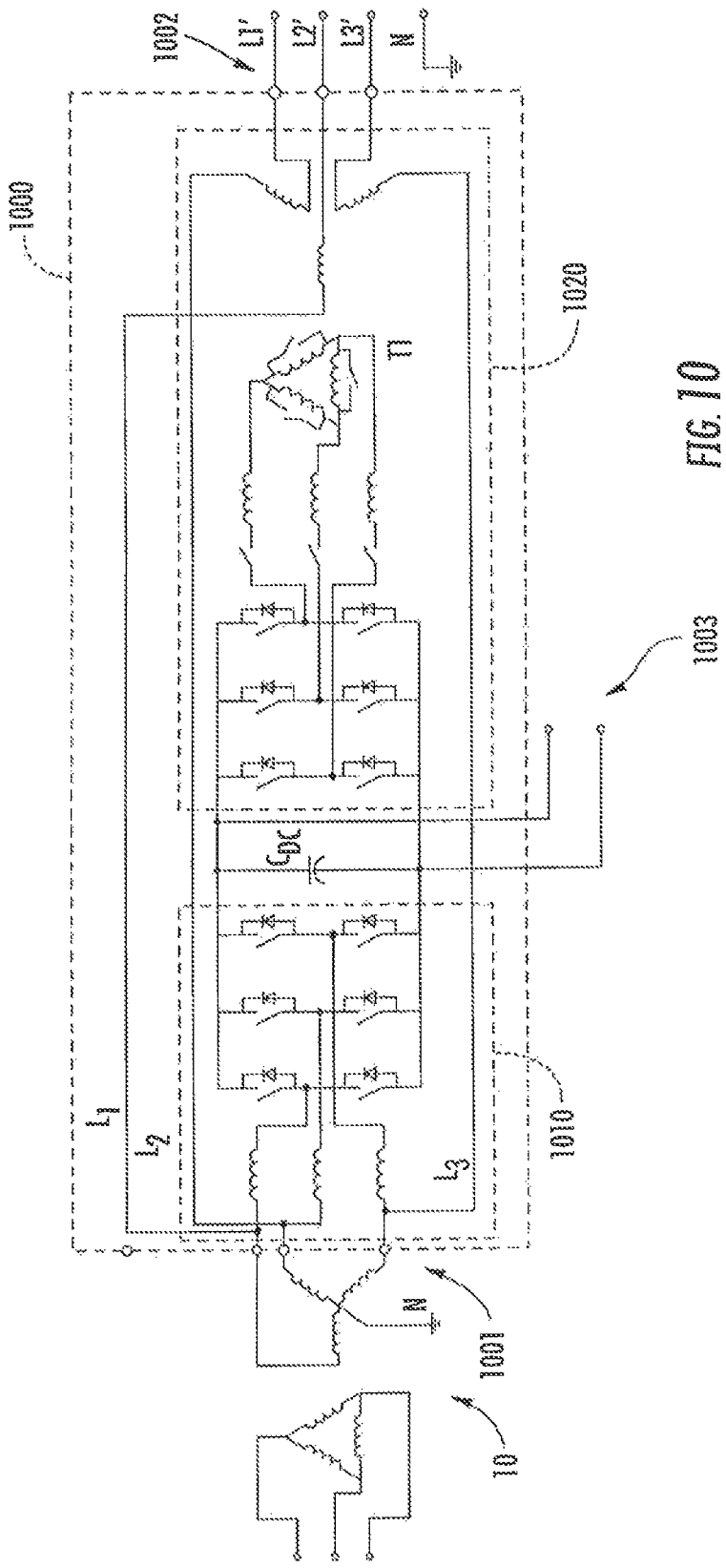

Embodiments of the inventive subject matter are also applicable to three-phase applications. As shown in FIG. 10, a distribution transformer interface apparatus 1000 includes external source terminals 1001 coupled to phase conductors L1, L2, L3 and configured to be connected to a secondary winding of a three-phase delta-wye transformer 10. External load terminals 1002 are coupled to phase conductors L1', L2', L3' and configured to be coupled to a load. A three-phase shunt converter circuit 1010 has a first port coupled to the external source terminals 1001. A three-phase series converter circuit 1020 is coupled to the external load terminals 1002 using a three-phase transformer T1 that has secondary winding coupled in series with respective ones of the conductors L1, L2, L3 from the distribution transformer phases. The shunt converter circuit 1010 and the series converter circuit 1020 are coupled by a DC bus, to which a capacitor CDC is coupled to provide energy storage. External DC terminals 1003 may also be coupled to the bus, for use in connecting to external energy storage and/or energy source devices, such as wind, solar, fuel cell or other generators. The shunt converter circuit 1010, the series converter circuit 1020 and other components of the apparatus 1000 may be controlled using, for example, a microprocessor-based controller.

Figure 11:
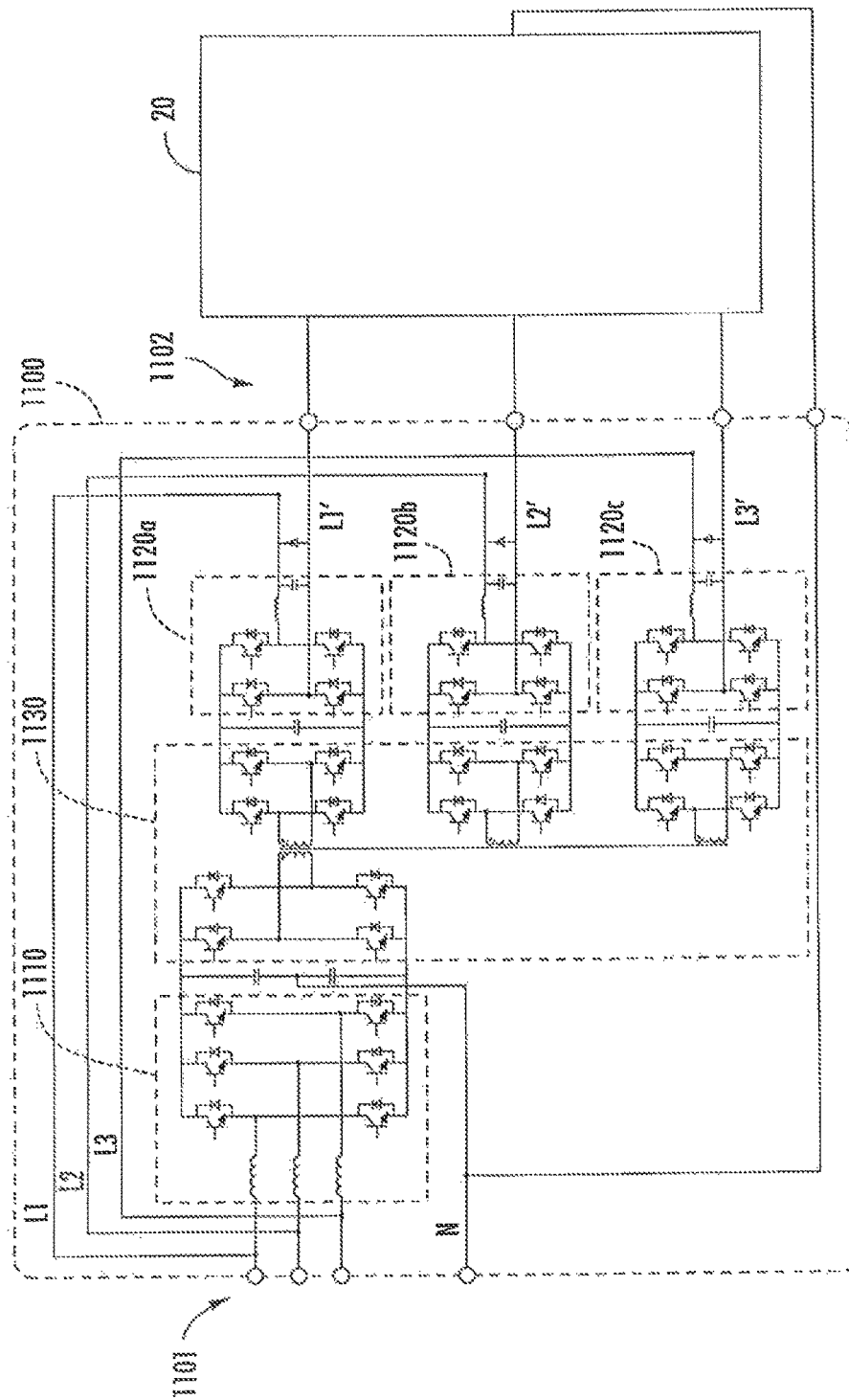

FIG. 11 illustrates a three-phase apparatus with a different configuration. A distribution transformer interface apparatus 1100 includes external source terminals 1101 coupled to phase and neutral conductors L1, L2, L3 and configured to be coupled to a three-phase distribution transformer. The apparatus 1100 further includes external load terminals 1002 coupled to phase conductors L1', L2', L3' and configured to be coupled to a load. A three-phase shunt converter circuit 1110 has a first port coupled to the external source terminals 1101. Three series converter circuits 1120a, 1120b, 1120c are coupled to the external load terminals 1002, in series with respective ones of the phase conductors L1, L2, L3 from the distribution transformer. The shunt converter circuit 1110 and the series converter circuits 1120a, 1120b, 1120c are coupled by a dual active bridge DC/DC converter circuit 1130, with capacitors providing energy storage. The shunt converter circuit 1110, the series converter circuit 1120a, 1120b, 1120c, the DC/DC converter circuit 1130 and other components of the apparatus 1100 may be controlled using, for example, a microprocessor-based controller.

Figure 12:
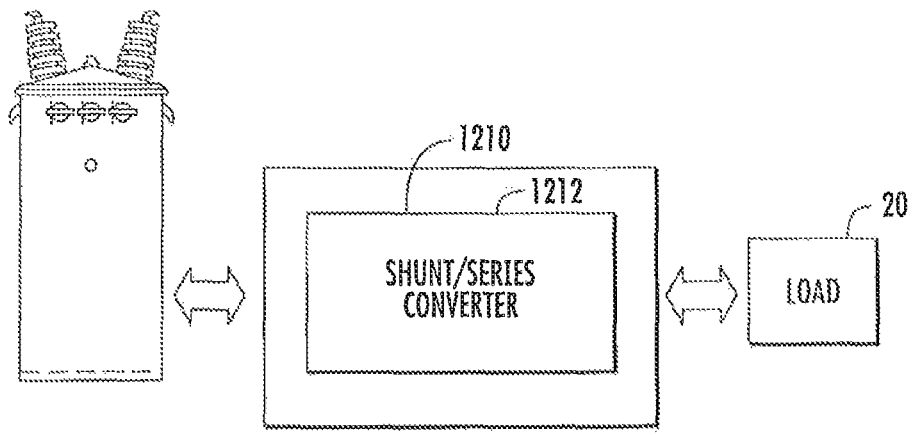
Figure 13:
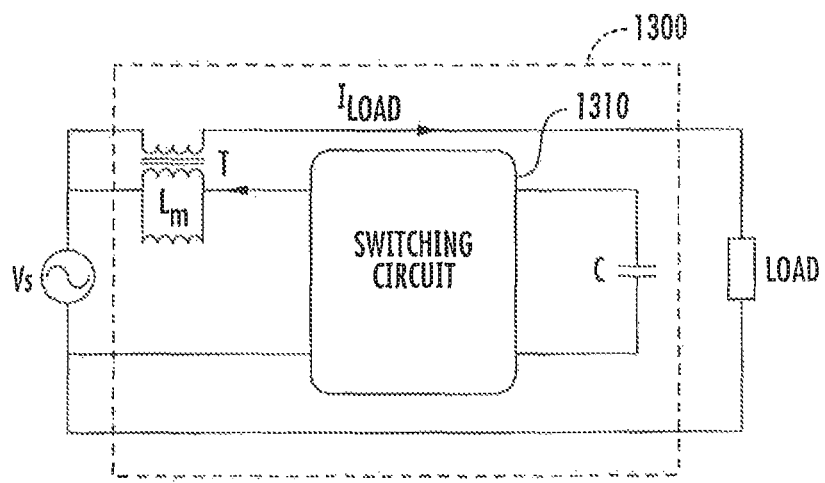

Referring to FIG. 12, according to further embodiments, a distribution transformer interface apparatus 1210 may use a combined shunt/series converter topology to provide current and voltage regulation for a distribution transformer in a manner similar to that discussed above. As shown in FIG. 13, such a shunt/series converter 1300 may include a single switching circuit 1310 that is coupled to a distribution transformer secondary, here illustrated as an AC source producing a voltage Vs, via primary and secondary windings of a transformer T. The shunt/series converter 1300 is also coupled to at least one energy storage device, here illustrated as a capacitor C. The shunt/series converter circuit 1300 may provide current regulation in a manner similar to the shunt converter circuits described above and may provide load voltage regulation in a manner similar to the series converter circuits described above. However, because of coupling through the transformer T, this regulation may generally not be independent, e.g., setting a desired load voltage may constrain current regulation, and vice versa.

Figure 14:
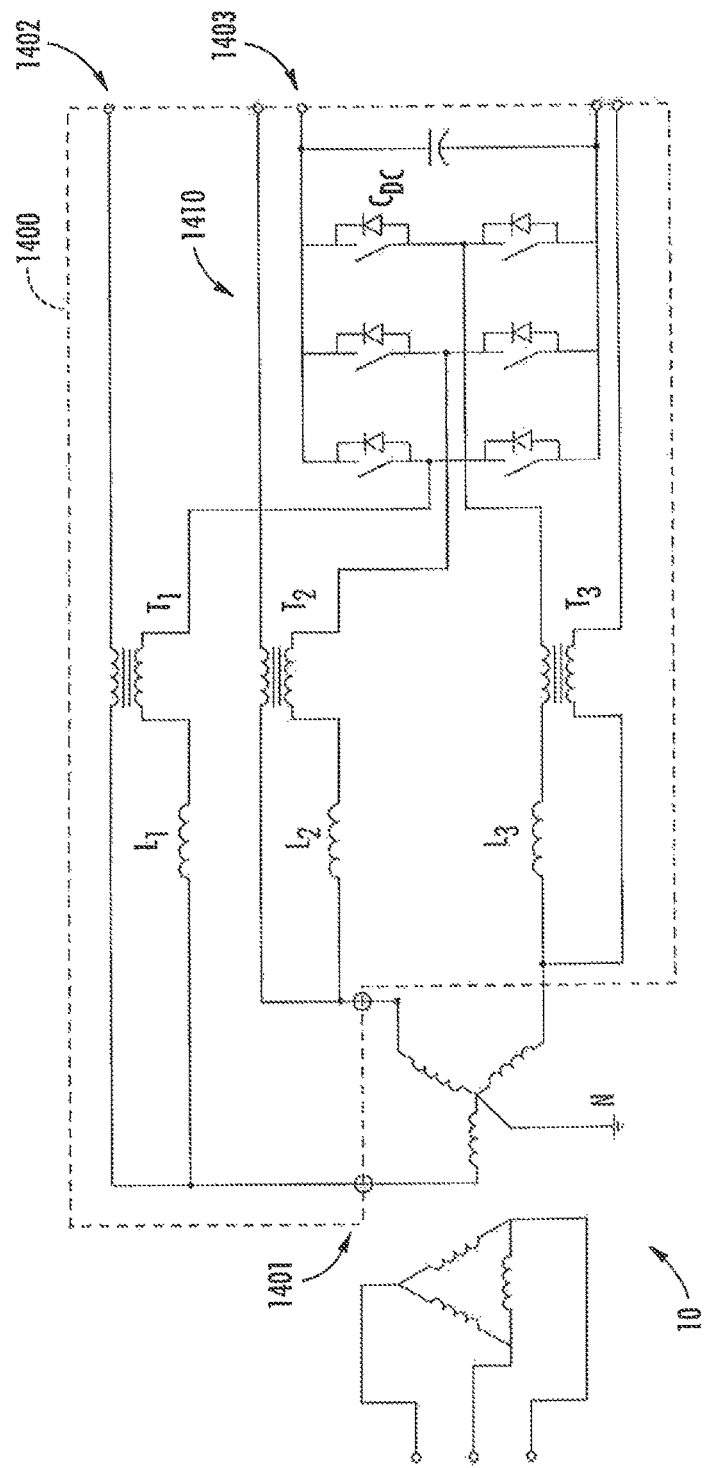

FIG. 14 illustrates a distribution transformer interface apparatus 1400 with a three-phase shunt/series converter according to some embodiments. The apparatus 1400 includes external source terminals 1401 configured to be coupled to a three-phase distribution transformer 10 and external load terminals 1402 configured to be coupled to a load. The apparatus 1400 includes a shunt/series converter including a three-phase switching circuit 1410 coupled to a storage capacitor CDC and configured to be coupled to the distribution transformer 10 via transformers T1, T2, T3 and inductors L1, L2, L3. The apparatus 1400 may also include external DC terminals 1403 for connection to, for example, an external energy storage device, such as at least one battery and/or capacitor bank, and/or to an external energy or power source, such as a solar generator, wind generator or fuel cell.

Figure 15:
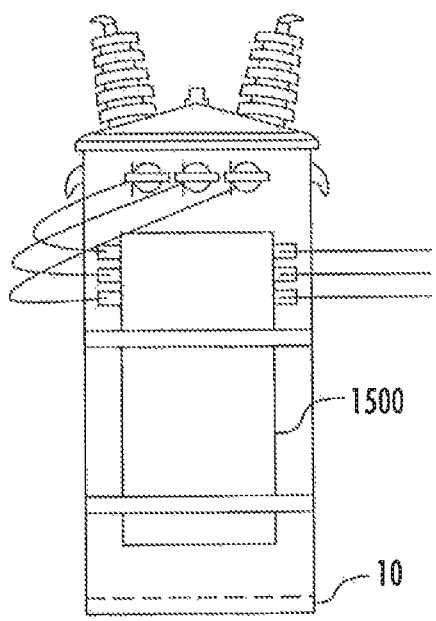
FIGS. 15 and 16 are illustrations of mounting configurations distribution transformer interface apparatus according to some embodiments of the inventive subject matter.
Figure 16:
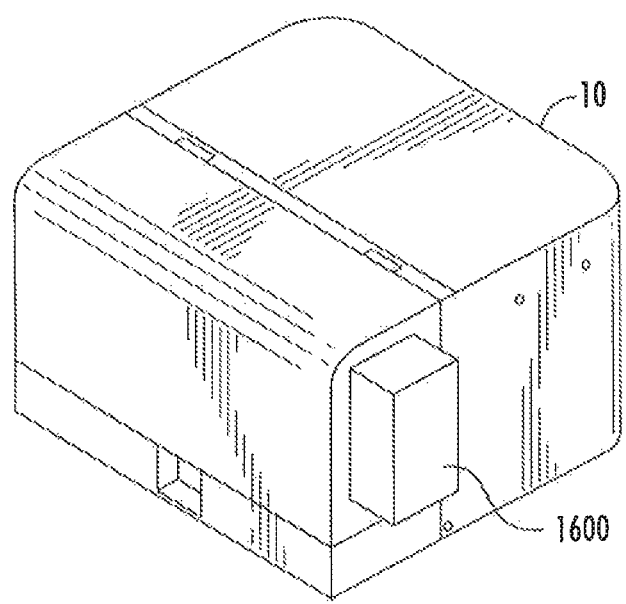

According to some embodiments, a distribution transformer interface apparatus may be implemented as a unit that may be mounted on or near a distribution transformer. For example, referring to FIG. 15, circuitry along the lines described above with reference to FIGS. 1-11 may be packaged as unit 1500 configured to be attached to the housing of a pole-mount distribution transformer 10. As illustrated in FIG. 16, a similar package 1600 may be configured for attachment and connection to a pad-mount transformer 10. It will be appreciated that distribution transformer apparatus according to embodiments of the inventive subject matter may be deployed in other ways, for example, as in a unit configured to be mounted on a power distribution pole near a pole-mount transformer or at other locations that proximate a distribution transformer, such as at or near a service entrance meter base.

Figure 17:
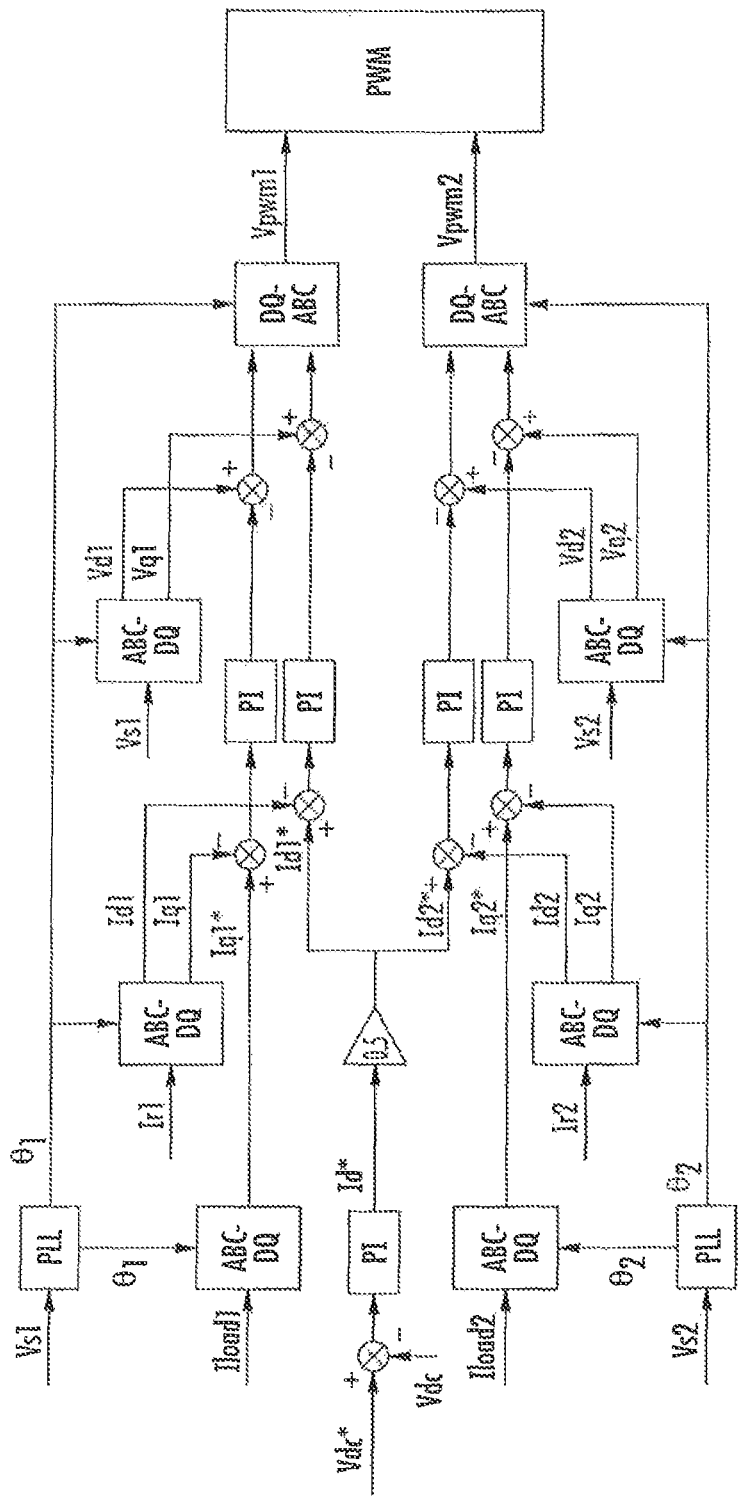
FIGS. 17-19 are block diagrams illustrating examples of converter control architectures according to some embodiments.
Figure 18:
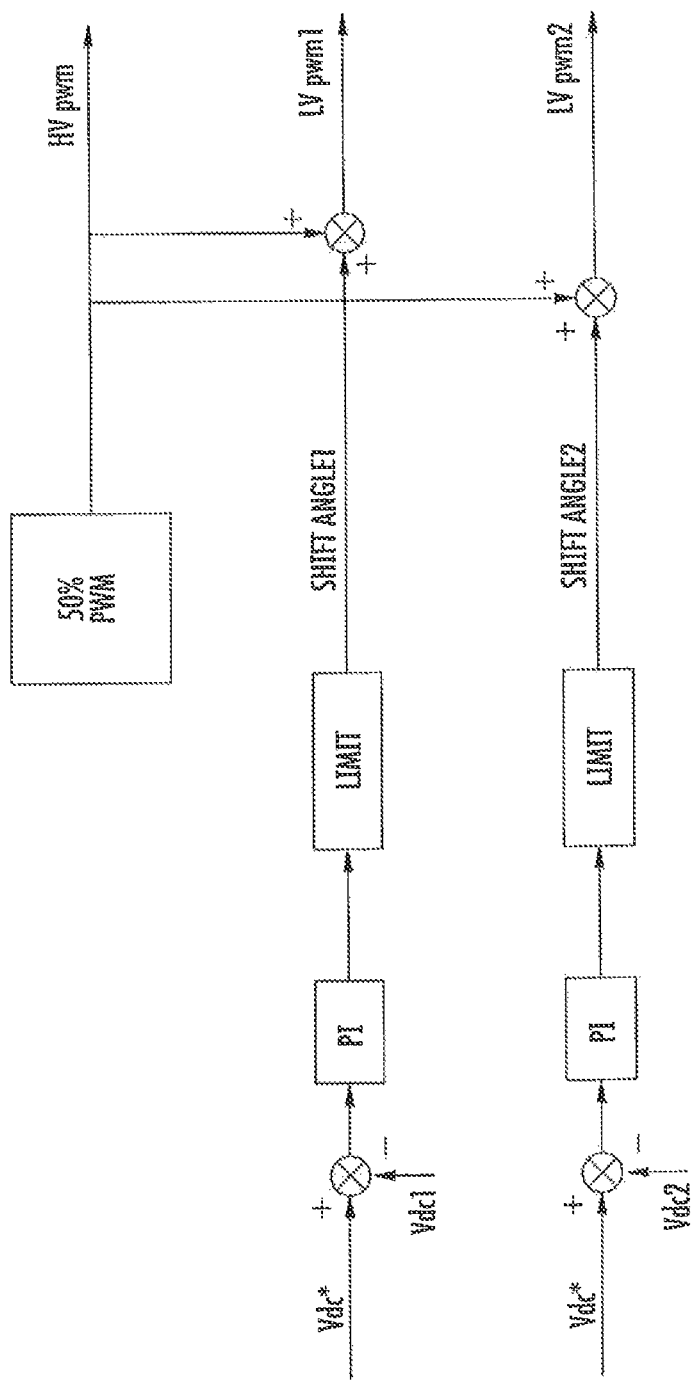
Figure 19:
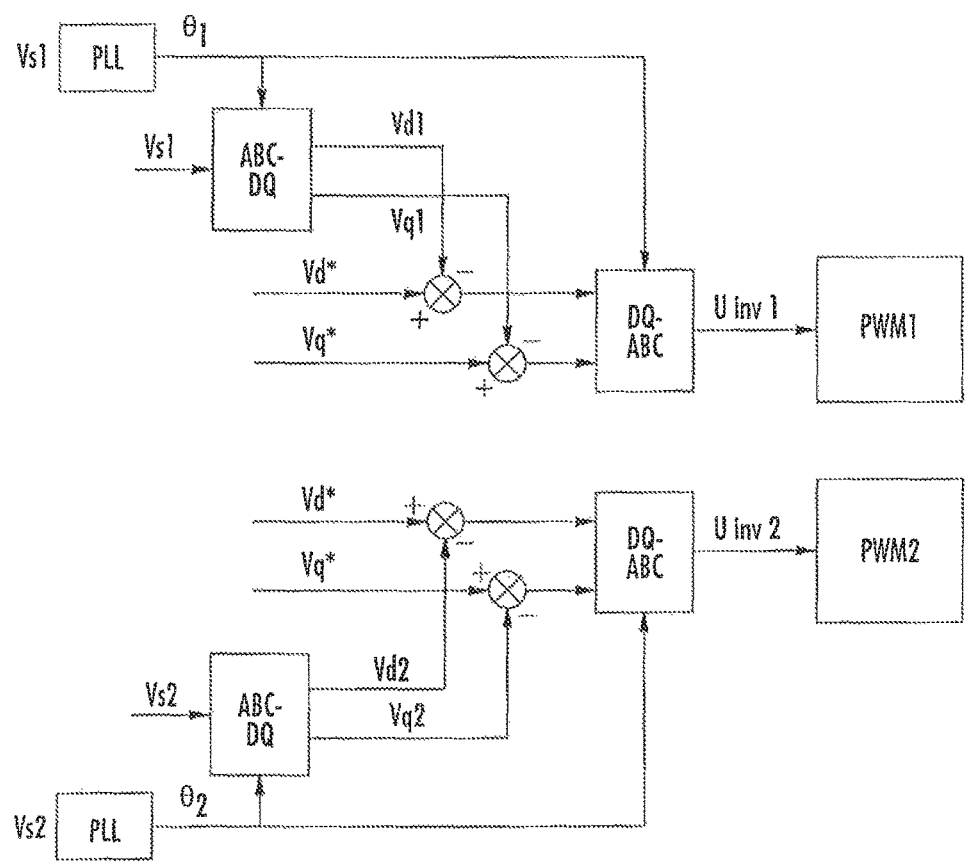

FIGS. 17-19 illustrate various converter control architectures that may be used in some embodiments. It will be appreciated that, in general, these control architectures may be implemented using analog and/or digital circuitry, including, but not limited to, one or more processors (e.g., microprocessor, microcontroller, digital signal processor or the like), interface circuitry and/or driver circuitry. Such circuitry may be implemented using discrete and/or integrated circuit components, including application specific integrated circuits (ASICs).

FIG. 17 illustrates an example of a control architecture that may be used, for example, in the shunt converter circuit 710 of FIG. 7. A signal Vdc representing a voltage of the DC bus coupling the converter circuit 710 to the DAB circuit 730 is compared to a reference voltage signal Vdc* to generate an error signal, which is processed using a proportional integrator (PI) to produce a d component current reference signal Id*. This d component current reference signal Id* is provided to two identical control loops that control respective half-bridges of the converter circuit 710 coupled to the respective phase conductors L1, L2. The control loops operate to match the reactive currents at the phase conductor L1 and L2 inputs of the converter circuit 710 with the reactive currents of the loads connected to the output phase conductors L1', L2' so that reactive transfer at the grid is reduced. The loops also control real power transfer to maintain a predetermined voltage on the DC link connecting the shunt converter circuit 710 to the DAB circuit 730.

A phase-locked loop (PLL) receives a signal Vs1 representing the voltage at the source phase conductor L and responsively generates a phase reference signal e1 for operations of phase (ABC) space to d-q space converters (ABC-DQ) and d-q space to phase (ABC) space converters (DQ-ABC). A load current signal Iload1 for the output phase L1' is transformed to d-q space to generate a q component current reference signal Iq1*. The q component current reference signal Iq1* is compared with a q component current signal Iq1 generated from a signal Ir1 representing an input current of the phase L1 coupled to the converter circuit 710, to generate an error signal that is processed in a proportional integrator (PI). The d component current reference signal Id1* is compared to ad component current signal Id1 generated from the signal Ir1 to generate another error signal that is processed in another proportional integrator (PI). The outputs of these proportional integrators (PI) are compared with respective d and q component voltage signals Vd1 and Vq1, which are derived from the signal Vs1 representing the voltage at the source phase conductor L1. The resulting error signals are converted back to the phase (ABC) space to generate a pulse width modulation control signal Vpwm1, which drives a pulse width modulation circuit, e.g., a driver circuit that drives the half-bridge of the shunt converter circuit 710 that is coupled to the phase conductor L1.

Another phase-locked loop (PLL) receives a signal Vs2 representing the voltage at the source phase conductor L2 and responsively generates a phase reference signal θ2 for operations of phase (ABC) to d-q space converters (ABC-DQ) and d-q space to phase (ABC) space converters (DQ-ABC). A load current signal Iload2 for the output phase L2' is transformed to d-q space to generate a q component current reference signal Iq2*. The q component current reference signal Iq2* is compared with a q component current signal Iq2 generated from a signal Ir2 representing an input current of the phase L2 coupled to the converter circuit 710, to generate an error signal that is processed in a proportional integrator (PI). The d component current reference signal Id2* is compared to a d component current signal Id2 generated from the signal Ir2 to generate another error signal that is processed in another proportional integrator (PI). The outputs of these proportional integrators (PI) are compared with respective d and q component voltage signals Vd2 and Vq2, with are derived from the signal Vs2 representing the voltage at the source phase conductor L2. The resulting error signals are converted back to the phase (ABC) space to generate a pulse width modulation control signal Vpwm2, which drives a pulse width modulation circuit, e.g., a driver circuit that drives the half-bridge of the shunt converter circuit 710 that are coupled to the phase conductor L2.

FIG. 18 illustrates an example of a control architecture that may be used for a DAB circuit, such as the dual-output DAB circuit 730 of FIG. 7. The half-bridges of the DAB circuit 730 that are coupled to the shunt converter circuit 710 (i.e., the higher voltage side of the DAB circuit 730) are operated at a 50% duty cycle. Signals Vdc1, Vdc2 representing the DC voltages of the respective DC buses connecting the DAB circuit 730 to respective ones of the series converter circuits 720a, 720b are compared to a reference voltage signal Vdc* to generate error signals that are processed by respective proportional integrators (PI). The outputs of the proportional integrators (PI) represent respective angular shifts with respect to the duty cycle of the half-bridges of the high voltage side of the DAB circuit 730, and are used to drive the half-bridges of the low voltage side of the DAB circuit 730. This control architecture provides a desired DC voltage (e.g., 24V) to the series converter circuit 720.

FIG. 19 illustrates an open-loop control architecture that may be used, for example, in the series inverter circuit 720 of FIG. 7. A phase-locked loop (PLL) receives a signal Vs1 representing the voltage at the source phase conductor L1 and responsively generates a phase reference signal θ1 for operations of phase (ABC) space to d-q space converters (ABC-DQ) and d-q space to phase (ABC) space converters (DQ-ABC). Conversion of the voltage signal VS1 to d-q space produces d and q component voltage signals Vd1, Vq1. Respective ones of the d and q component voltage signals Vd1, Vd2 are compared to respective d and q component voltage reference signals Vd* and Vq*, producing error signals that are converted back to phase (ABC) space to provide control signals for a pulse width modulation circuit PWM1 that drives the half-bridges of the first series converter circuit 720a.

Another phase-locked loop (PLL) receives a signal Vs2 representing the voltage at the source phase conductor L2 and responsively generates a phase reference signal θ2 for operations of phase (ABC) to d-q space converters (ABC-DQ) and d-q space to phase (ABC) space converters (DQ-ABC). Conversion of the voltage signal VS2 to d-q space produces d and q component voltage signals Vd2, Vq2. Respective ones of the d and q component voltage signals Vd2, Vd2 are compared to respective d and q component reference voltage signals Vd* and Vq*, producing error signals that are converted back to phase (ABC) space to provide control signals for a pulse width modulation circuit PWM2 that drives the half-bridges of the second series converter circuit 720b.

It will be appreciated that the control architectures shown in FIGS. 17-19 are provided for purposes of illustration, and that other control architectures may be used in various embodiments of the inventive subject matter. For example, more complex closed-loop control architectures may be used in place of the open-loop architecture described above with reference to FIG. 19.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
   at least one external source terminal configured to be connected to at least one secondary terminal of a distribution transformer;
   at least one external load terminal configured to be connected to a load;
   a shunt converter circuit having a first port coupled to the at least one external source terminal to provide parallel connection to a secondary winding of the distribution transformer, wherein the distribution transformer is not coupled to the at least one external source terminal via a shunt transformer;
   a series converter circuit having a first port coupled to the at least one external load terminal and a second port coupled to a second port of the shunt converter circuit, and
   wherein the apparatus is independent of the distribution transformer.

2. The apparatus of claim 1, wherein the shunt converter circuit and the series converter circuit are configured to control a current at the at least one external source terminal and a voltage at the at least one external load terminal, respectively.

3. The apparatus of claim 1, further comprising at least one energy storage device coupled to the second ports of the shunt converter circuit and the series converter circuit.

4. The apparatus of claim 1, wherein the series converter circuit comprises:
   a switching circuit; and a transformer having a first winding coupled to the switching circuit and a second winding configured to be coupled in series with the load.

5. The apparatus of claim 1, wherein the series converter circuit comprises a switching circuit.

6. The apparatus of claim 1, wherein the shunt converter circuit comprises a switching circuit.

7. The apparatus of claim 1, wherein the shunt converter circuit comprises a first switching circuit and the series converter circuit comprises a second switching circuit, the apparatus configured such that the first switching circuit powers the second switching circuit for a desired quantity of power processing.

8. The apparatus of claim 1,
a DC bus coupling the second ports of the shunt converter circuit and the first port of the series converter circuit; and
at least one external DC terminal coupled to the DC bus and configured to be coupled to an external device.

9. The apparatus of claim 8, wherein the apparatus is configured such that the shunt converter circuit regulates the voltage at the first port of the series converter circuit.

10. The apparatus of claim 1, wherein the at least one external source terminal, the at least one external load terminal, the shunt converter circuit and the series converter circuit are packaged in a unit configured to be mounted proximate the distribution transformer.

11. The apparatus of claim 10, wherein the unit is configured to be mounted on a pole-mount distribution transformer and/or on a pad mounted distribution transformer.

12. The apparatus of claim 1, further comprising a bypass switch configured to bypass the series converter circuit.

13. The apparatus of claim 1, further comprising a manual external bypass switch configured to enable an operator to bypass the apparatus.

14. The apparatus of claim 1, wherein the shunt converter circuit and the series converter circuit are each configured to support single-phase, split-phase and multi-phase applications.

15. A distribution transformer interface unit comprising:
a frame;
a set of source terminals supported by the frame and configured to be coupled to a set of secondary terminals of a distribution transformer;
a set of load terminals supported by the frame and configured to be coupled to a load;
a shunt converter circuit supported by the frame and coupled to the set of source terminals via an electrical connection to provide parallel connection to a secondary winding of the distribution transformer, wherein the electrical connection does not include a shunt transformer;
a series converter circuit supported by the frame and coupled to the set of load terminals to provide series connection with the load and coupled to the shunt converter circuit via a DC bus, and
wherein the interface unit is independent of the distribution transformer.

16. The distribution transformer interface unit of claim 15, further comprising an energy storage device supported by the frame and coupled to the DC bus.

17. The distribution transformer interface unit of claim 16, wherein the energy storage device comprises at least one capacitor.

18. The distribution transformer interface unit of claim 16, wherein the energy storage device comprises at least one battery.

19. The distribution transformer interface unit of claim 15, further comprising an energy source device coupled to the DC bus.

20. The distribution transformer interface unit of claim 15, further comprising a set of DC connection terminals coupled to the DC bus and configured to be coupled to an external device.

21. The distribution transformer interface unit of claim 15, wherein the frame is configured to be mounted on or near the distribution transformer.

22. A method of retrofitting an existing distribution transformer, the method comprising:
mounting a distribution transformer interface unit on or near the existing distribution transformer, the distribution transformer interface unit comprising a shunt converter circuit and a series converter circuit coupled by a DC bus; and
connecting the distribution transformer interface unit to a secondary winding of the existing distribution transformer and to a load to support parallel coupling of the shunt converter circuit and the secondary winding and series coupling of the series converter circuit and the load, wherein the connection between the distribution transformer interface unit and the secondary winding does not include a shunt transformer.

23. The method of claim 22, further comprising operating the shunt converter circuit and the series converter circuit to regulate a current in the secondary winding and a voltage at the load, respectively.

24. The method of claim 22, further comprising connecting the DC bus of the distribution transformer interface unit to an external device.

* * * * *